United States Patent [19]

Steiner

[11] Patent Number: 4,839,106

[45] Date of Patent: Jun. 13, 1989

[54] PORTABLE MISTING FAN

[75] Inventor: Gregory Steiner, Lisle, Ill.

[73] Assignee: Gregory A. Steiner, Lisle, Ill.

[21] Appl. No.: 192,964

[22] Filed: May 12, 1988

[51] Int. Cl.⁴ ............................................. B01F 3/04
[52] U.S. Cl. .................................. 261/28; 261/78.2; 239/289
[58] Field of Search ................ 261/78.2, 28; 239/77, 239/78, 289, 355; 34/90, 97

[56] References Cited

U.S. PATENT DOCUMENTS

| | | | |
|---|---|---|---|
| 2,171,932 | 9/1939 | Holmboe et al. | 261/78.2 |
| 2,738,226 | 3/1956 | Bals | 239/77 |
| 2,906,513 | 9/1959 | Tabor | 261/78.2 |
| 2,925,222 | 2/1960 | Spreng | 239/78 |
| 2,928,664 | 3/1960 | Grosholz | 261/78.2 |
| 3,064,360 | 11/1962 | Sholin | 34/91 |
| 3,128,036 | 4/1964 | McBride | 239/77 |
| 3,409,221 | 11/1968 | Patterson | 239/77 |
| 3,446,424 | 5/1969 | Wolford | 239/77 |
| 3,625,434 | 12/1971 | Kitover | 239/289 |
| 3,727,322 | 4/1973 | Walter et al. | 34/97 |
| 3,947,659 | 3/1976 | Ono | 34/91 |
| 4,114,022 | 9/1978 | Braulke | 34/97 |
| 4,383,951 | 5/1983 | Palson | 261/30 |
| 4,538,362 | 9/1985 | Andis | 34/97 |

Primary Examiner—Tim Miles
Attorney, Agent, or Firm—Basil E. Demeur; Robert E. Knechtel; Alan B. Samlan

[57] ABSTRACT

There is disclosed a portable fan device including atomizing means associated therewith, particularly adapted for cooling sunbathers. The device is formed by a base which is adapted to contain a source of fluid, an intermediate neck portion extending upwardly from the base and terminating in a head portion, the head portion carrying a fan and atomizing means associated therewith. The portable electrical means, such as a battery pack, are carried in the base, and electrically wired to the fan with a switch interposed in said circuit in order to permit the fan to be actuated to blow air. The atomizing means is positioned in the head portion immediately below the fan means and may be manually manipulated in order to create a mist which blows out immediately in the path of the fan. The subject fan device permits the user to actuate the fan and the atomizing means at any given time in order to create a misting cooling effect, especially in the environment of sunbathing.

10 Claims, 2 Drawing Sheets

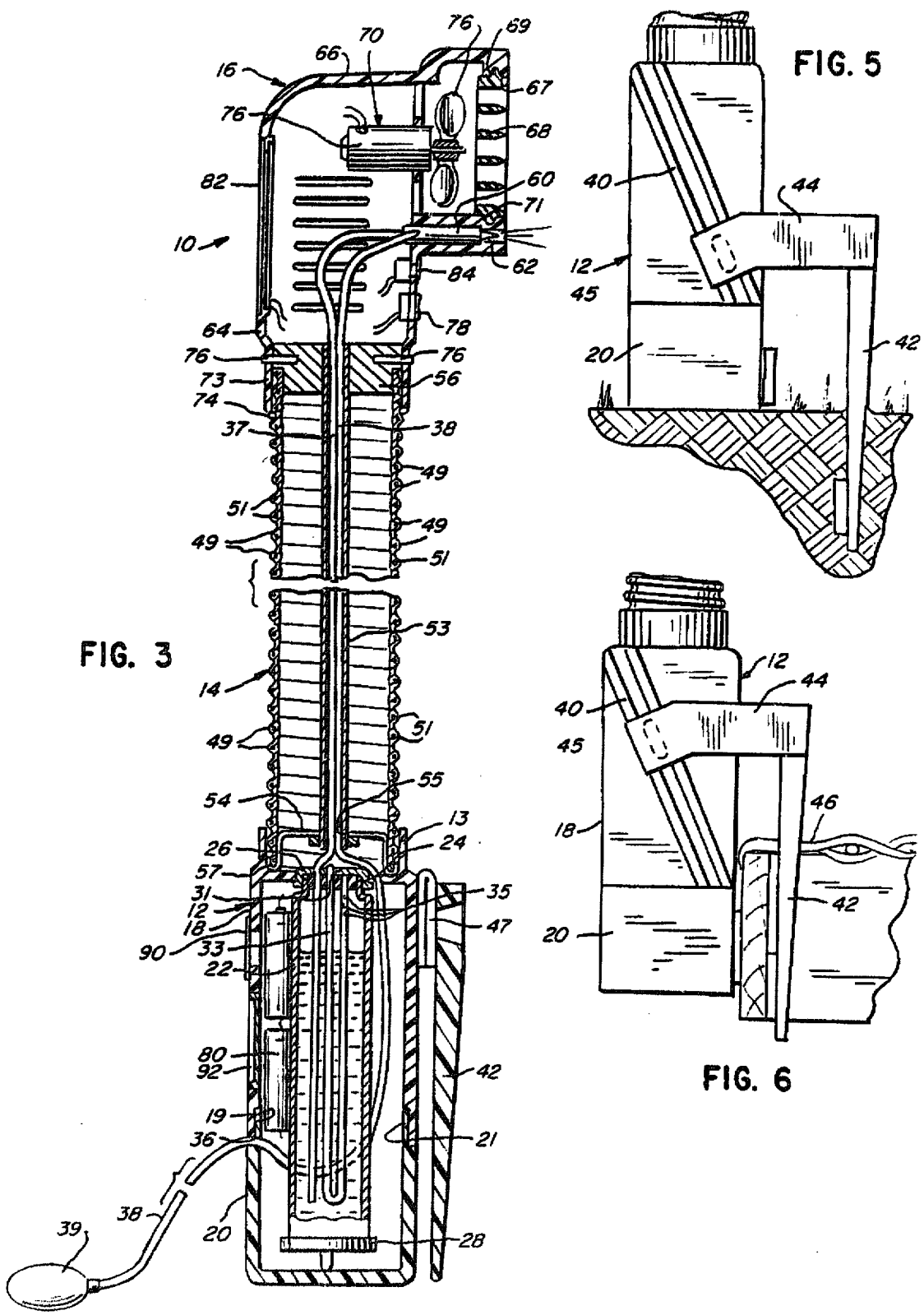

PORTABLE MISTING FAN

BACKGROUND OF THE INVENTION

The art field relating to portable fans has been fairly well advanced, and in the most typical formats of such portable fans, devices generally take the format of a flashlight assembly having a fan head mounted at the top end, and wherein the casing contains a pair of batteries to electrically operate the fan. Such types of devices have been used for a variety of purposes and reasons, such as typically, use on barbeque grills in order to create a rapid expansion of the zone of ignited coals therein. Other uses consist of small battery powered portable fans which permit the user to evacuate smoke from the environmental area immediately adjacent the user's face to eliminate, or at least minimize the inhaling of second hand smoke.

Other such portable fans are provided with heaters, such that the fan may be utilized as a heating device but rapidly transported from one location to another.

It has been determined that an additional use for such portable fans would be to provide a portable fan device which can be utilized by sunbathers incident to their sunbathing activities. It has now become known that excessive exposure to the ultraviolet rays of the sun can have a deleterious effect to health, and it is now deemed desirable to provide a device which not only has a cooling effect upon the body during the sunbathing process, but can also be utilized for the purpose of administering sunshielding chemical compositions. With respect to the portable fan devices as now exist in the prior art, no such device presently exists which will accomplish the application, automatically, of sunscreening agents or chemicals. For example, various types of portable fans are disclosed by a variety of prior art patents. For example, U.S. Pat. No. 3,647,323 illustrates a typical battery operated fanning device which is particularly adapted for use in connection with charcoal barbeque grills in order to enhance or rapidly expand the zone of igniting the coals contained in the grill. The device incorporates a fan carried adjacent the head of the device, which is powered electrically by a pair of batteries contained within a battery casing, and a switch means for activating the electrical circuit in order to actuate the fan to blow air out of the upper head portion. The device may be conveniently clamped to the barbeque grill, and create air movement over the coals in order to effect rapid ignition thereof.

Other versions of portable electric fans are disclosed in patents such as U.S. Pat. Nos. 2,909,316, as well as 2,595,406, and finally 2,803,527. In each of these three instances, different formats of portable electric fan units are disclosed wherein a fan device is interconnected by electrical means with a source of power such as batteries, and the unit being a hand held type device which permits the user a wide variety of functions. Typically, such portable fans are utilized for blowing smoke away from the user's environment, or as indicated above, creating a field of air movement to facilitate the ignition of charcoal grills. It is apparent that such types of portable fans can similarly be used by sunbathers in order to achieve a cooling effect on the skin while it is clear that such devices will in fact afford a fanning or cooling effect when utilized, nevertheless, no device has been provided which will permit the user to also apply cooling fluids in the form of a mist, or even more importantly, the fluid which contains a sunblocking chemical agents, in mist form, onto the skin of the body.

OBJECTS AND ADVANTAGES

It is therefore the principal object of the present invention to provide an improved portable fan device which further includes atomizing means associated therewith, such that the device will produce not only a cool air stream, but also, provide an atomized mist in the path of the air stream created by the fan in order to apply a cooling atomizied mist to the skin of the user.

In conjunction with the foregoing object, it is a further object to provide a portable fanning device which is formed by a base adapted to contain a source of fluid, an elongated intermediate neck portion extending upwardly from the base, and a head portion affixed to the top of the neck portion, the head portion having an open front face, and having a fan mounted therein and spaced rearwardly a distance from the open front face, the front face further including a baffle vent mounted thereon and spaced slightly forwardly of the fan, the baffle vent operating to spread the air flow immediately as the air stream passes out of the front face of the head portion.

In conjunction with the foregoing object, it is a further object to provide a device of the type described, wherein the head portion further includes atomizing means mounted therein, and positioned in operative relationship with respect to the fan, the atomizing means being in fluid communication with the source of fluid contained in the base, and having manually operated activation means such that upon manual manipulation of such activation means, fluid is drawn from the source of fluid in the base to the atomizing head wherein the fluid is atomized, and disbursed into the air stream created by the fan such that the ultimate air stream contains not only cool air, but an atomized fluid which may be applied to the skin of the user.

In conjunction with the foregoing objects, it is a further object of the present invention to provide a portable fan device of the type described, wherein the fan means is operated by electrical means consisting of a battery pack carried in the base of the device, and electrically wired to the fan via switch means, thereby to eliminate the need for any external source of electrical power.

In conjunction with the foregoing object, it is a further object of the present invention to provide a portable fan device of the type described, wherein said battery pack is formed by a rechargeable solar battery pack, and the portable fan device further including a solar recharging cell formed therein and an electrical contact with the solar rechargeable battery pack, such that the battery pack is permitted to recharge the batteries when not in use, by means of the solar recharging cell.

The further object of the present invention is to provide a portable fan device of the type described, wherein the base is further ideally provided with mounting means for permitting the entire device to be mounted to underlying support structures.

In conjunction with the foregoing object, a further object of the present invention is to provide mounting means wherein the mount means rail is formed on the base of the device, and the mounting means consists of a clamp having a pair of rail arms mounted thereon and adapted to be slidably engageable in the mount rails formed on the base, the clamp thereby being permitted to slidably move along the length of the mount rails, such that in the raised position, the mount means consists of a clamp suitable for clamping the device to adjacent support structures such as chairs and the like, and in the lowered position, the clamp functions as a staking member permitting the device to be staked into the ground such that the device remains in an upright position for use.

Further features of the invention pertain to the particular arrangement of the parts whereby the above-outlined and additional operating features thereof are attained.

The invention, both as to its organization and method of operation, together with further objects and advantages thereof will best be understood by reference to the following specification taken in connection with the accompanying drawings.

BRIEF DESCRIPTION OF DRAWINGS

FIG. 3 is a side elevational view, in cross section, showing the details of construction of the portable fan device and the associated structures formed therein;

FIG. 5 is a side elevational view showing the mount means in the lower staking position thereby permitting the device to be staked into the ground to secure the same in its upright position; and FIG. 6 is a side elevational view, partly broken away, showing the portable fan device utilizing the mount means clamp as a clamping member suitable for clamping the same to an adjacent support structure such as a chair or the like.

SUMMARY OF THE INVENTION

In summary, the present invention provides an improved portable fan device, which includes not only a fan operated by a portable electrical system such as a battery pack, but which further has in conjunction therewith an atomizing head in fluid communication with a source of fluid, the atomizing head being operationally positioned relative to the fan means such that when the atomizing head is actuated, a mist is created and dispensed in the air path created by the fan. The base of the portable fan device includes a inner chamber which is removably engageable from the base, adapted to contain a source of fluid. The inner chamber which consists of the source of fluid is in fluid communication with an atomizing head which is mounted in the head portion of the device adjacent to the fan. The atomizing head is ideally operated by manual manipulation via a vacuum bulb, which in effect creates a negative pressure in the atomizing head thereby to draw fluid from the inner chamber in the base into the atomizing head where it can be atomized via an atomizing nozzle, and dispensed into the air path created by the fan. The opened front face of the head portion carries a baffle vent which is space forwardly of the fan, the baffle vent performing the important function of disbursing the air flow created by the fan in order to capture the mist created by the atomizing head.

It is contemplated that the fluid contained within the inner chamber in the base may be either water, in which event, a further cooling effect will be achieved by the user, or, a fluid containing sunblocking chemical agents may be contained in the inner chamber, such that upon dispensing the mist into the air path created by the fan, and depositing those chemical agents upon the skin of the user, a sunblocking effect will be achieved in order to protect the user from the harmful effects of the sun.

A further advantageous feature of the present invention relates to the fact that the intermediate neck portion which interconnects the upper head to the lower base is formed by semirigid flexible tubular member, which permits the head to be manipulated and moved into any number of positions such that the air flow including the atomized mist may be aimed by the user as desired. The intermediate neck portion being tubular and hollow throughout its length, permits the apparatus contained in the upper head portion to be connected with the source of fluid as well as the electrical source carried in the base portion.

A further advantage to the present invention relates to the fact that the inner chamber contained in the base is removably engageable therein, such that the inner chamber may be easily removed from the device in order to permit the user to easily refill the chamber with the desired fluid. Similarly, the battery pack located in the base is also removable such that the batteries may be easily removed for replacement purposes or the like.

DETAILED DESCRIPTION OF DRAWINGS

Figure 1:
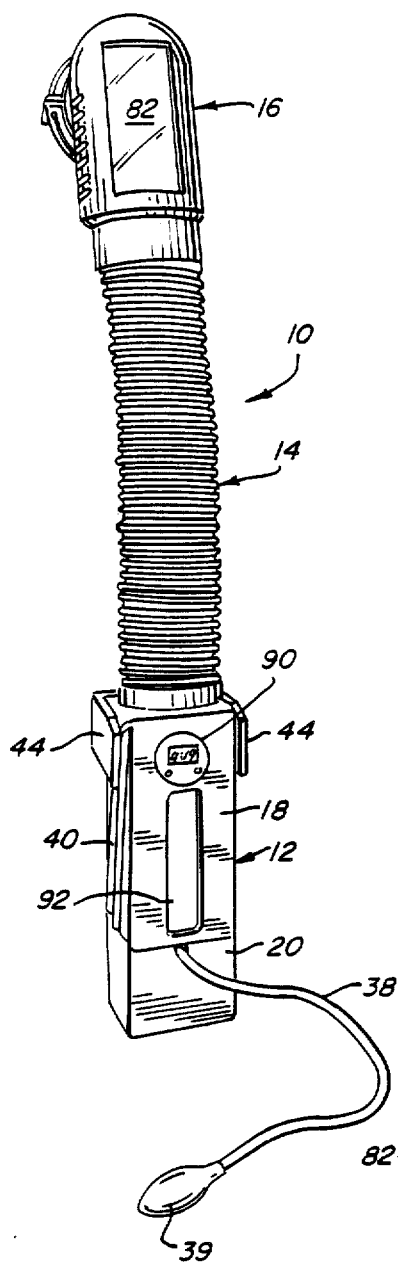
FIG. 1 is a rear elevational view showing the portable fan device of the present invention as formed by a base, intermediate neck portion and upper head portion.
Figure 2:
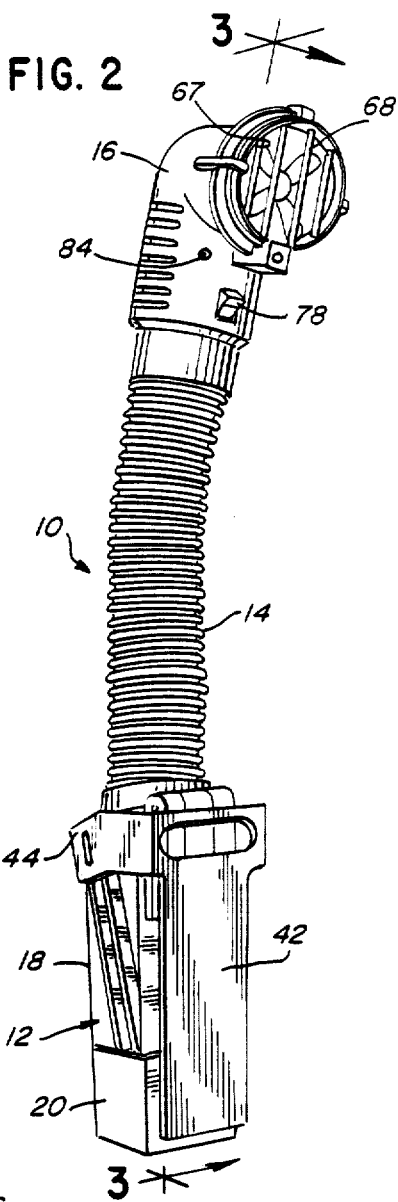
FIG. 2 is a front elevational view showing the portable fan device being formed by a base having the clamp mounting means formed thereon, the intermediate neck portion extending upwardly from the base, the upper head portion including an opened front face having a baffle vent mounted thereon, and having the fan positioned in the head portion and spaced rearwardly from the baffle vent.

Referring now to the drawings, and more particularly, to FIGS. 1, 2 and 3 of the drawings, the device and its operative parts will be observed in detail. The portable fan device 10 is shown to be formed generally by a base 12, an intermediate neck portion 14, and an upper head portion 16. With specific reference to the base, it will be noted that the base consists of an upper base section 18, and a lower base section 20. The lower end of the upper base section 18 includes an interior undercut shoulder portion 19 while the upper end of the lower base section 20 includes a rim 21 such that the rim 21 snap fittingly or friction fittingly engages the undercut shoulder section of the upper base section 18 such that the lower base section 20 is removably engageable from the upper section 18.

It will further be observed that the base 12 is provided with an inner chamber 22 which is designed to be removably engageable therefrom. The inner chamber 22 contains a source of fluid therein, and by having the same removably positioned within the base 12, the same may be removed for purposes of refilling with fluid. It will be noted that the upper end of the inner chamber 22 includes a threaded portion 24 which engages a threaded cap 26 carried at the upper end of the base 12. The lower end of the inner chamber 22 is provided with an end cap 28 which has a spacer support 30 formed thereon thereby to support the inner chamber 22 relative to the bottom of the lower base section 20. It will be noted that the threaded cap 26 is provided with an appropriate aperture 31 and accommodates a vent tube 33 to pass therethrough. The vent tube is U-shaped in configuration having one end passing through the vent aperture 31 and exiting thereabove, and has an opposed end having vent holes 35 formed therein such that the interior confines of the inner chamber 22 are in effect vented to atmosphere. It will be noted that since the vent tube 33 exits through the threaded cap 26 into the chamber area formed by the elongate intermediate neck portion 14, which is otherwise, in open communication with the upper head portion 16, the inner chamber is in effect, vented to atmosphere. The precise configuration of the intermediate neck portion 14 and upper head portion 16 will be described hereinafter in order to more clearly understand the manner in which the inner chamber 22 is vented to atmosphere.

It will also be noted that the lower base portion 20 is provided with a tube opening 36 through which flexible tube 38 may pass. The outer end of the flexible tube 38 is provided with a vacuum bulb 39 for a purpose to be described more fully hereinafter. The opposed end of the flexible tube 38 is mounted to the atomizing head 60 and operates in conjunction therewith in a manner to be described more fully hereinafter.

It will also be observed from FIGS. 1 and 2 of the drawings, that the outer surface of the base 12 is provided with a pair of mount rails 40 integrally formed on the exterior surface thereof. As shown in FIGS. 5 and 6 of the drawings, the mount rails may be mounted in an angularly inclined disposition from top to bottom, for a purpose to be described more fully hereinafter. The base is shown to further contain mount means formed by a clamp 42 which has an upper end having a pair of rail arms 44 integrally formed therewith. The rail arms 44 extend inwardly, and contain an interior rail flange 45 which seats within the confines of the mount rails 40 such that the rail arms 44 and associated clamp 42 may be moved from an upper mount position (FIG. 6) to a lower staking position (FIG. 5). It will be noted that in the lower staking position as shown in FIG. 5 of the drawings, clamp 42 when manipulated to the lower staking position, extends downwardly beyond the base 12, and may then be used to stake the entire device into the underlying ground. This staking effect has the tendency to stabilize the entire portable fan device 10 when in use on a ground surface. On the other hand, when the clamp is moved upwardly by manipulating the rail arms 44 upwardly along the mount rails 40, the clamp 42 is positioned into its clamping posture, and may then be used to clamp the portable fan device to an adjacent support structure such as a chair 46.

It will further be noted that in order to aid the clamping feature of the clamp 42, a hinge 47 is mounted to the under surface of the clamp 42 and is interposed between the clamp 42, and the base 12. The hinge 47 normally biasingly urges the clamp 42 into a position close to the base 12, but permits the clamp 42 to be hingedly moved outwardly such that the clamp 42 may be tightly clamped to the chair 46 as shown in FIG. 6 of the drawings.

The intermediate neck portion 14 is shown to be formed by a plurality of rib members 49 which includes structural wire supports 51 imbedded therein. The intermediate neck portion 14 may be formed of any material so long as the same is rigidly flexible in order to maintain an upright position, but sufficiently flexible in order to permit the upper head portion 16 to be moved into any position as may be desired by the user. Furthermore, the intermediate neck portion 14 is shown to be substantially hollow throughout its length, with the exception of a centrally positioned flexible tube member 53 which traverses the entire length thereof. The tube member 53 is provided in order to contain and maintain the flexible tube 38 therein, as well as fluid supply tube 37. It will be noted that the upper end of the flexible tube 38 is connected to the atomizing head 60, and the fluid supply tube 37 is similarly connected to the atomizing head 60. In a manner which is well known in the art, when the user manipulates the vacuum bulb 39, a negative pressure is created in the atomizing head 60 which will draw fluid from the inner chamber 22 through the fluid supply tube 37 into the atomizing head 60, thereby providing an atomizing nozzle 62, the fluid is presented in mist form as the same exits from the atomizing nozzle 62. Once again, the tube member 53 must be formed of a material which is rigidly flexible, in that it must rigid to support the two tubes 37 and 38 therein, while nevertheless being sufficiently flexible to permit the movement of the head portion 16 into any position as may be desired by the user. It will be noted that the tube member 53 is held in position by lower tube support 54 which has a central aperture 55 therein to accommodate the tube 53, and an upper tube support 56 supporting the upper end of the tube member 53. It will further be noted that the lower tube support 54 also accomplishes the function of mounting the intermediate neck portion 14 to the base 12. In this connection, the base 12 is provided with an upstanding rim 13, while the ends of the tube support 54 are formed into upturned U-shaped flanges 57. The lower end of the intermediate neck portion is nestled within the confines of the U-shaped flange 57, and the same is friction fittedly engaged within the confines of the upstanding rim 13 of the base 12.

The upper head portion 16 shown to be mounted to the top end of the intermediate neck portion 14, and carries therein the fan assembly 70, as well as the atomizing head 60. The upper head portion, in the preferred embodiment, is L-shaped in configuration, having a leg portion 64, the lower end of which mounts to the upper end of the intermediate neck portion 14, and a foot portion 66 which extends at right angles to the leg portion 64. The outer end of the foot portion 66 presents an open front face 67 and carries therein a baffle vent 68 securely mounted in the opened front face 67. It will be noted that the mounting is accomplished by providing a peripheral groove 69 in the open front face 67, and baffle vent 68 provided with a peripheral nib 71 which seats in the groove 69.

The baffle vent 68 is provided for the purpose of disbursing the air flow created by the fan assembly 70 thereby to facilitate the mixing of the mist dispensed from the atomizing nozzle 62 of the atomizing head 60. This assures that the fluid to be dispensed by the device is properly mixed with the air flow emanating from the device in order to achieve the desired result.

It has been found that by locating the atomizing head 60 immediately below the fan, and dispensing the fluid below the baffle vent 68, and by providing the baffle vent 68 in the position as noted, and a short distance forwardly of the fan assembly 70, the proper mixing effect is achieved.

It will be noted that the upper head portion 16 is mounted to the intermediate neck portion 14 by the use of the upper tube support 56. The lower end of the upper head portion 16 is provided with a circular collar 73, the lower end of which has in turned ends 74 which grip the intermediate neck portion 14 under one of the rib members 49. Preferably, the upper head portion 16 is further supported by a pair of pins 76 which function to pin the lower portion of the head portion 16 to the upper tube support 56. It will be appreciated that the mounting system for mounting the head portion 16 to the intermediate neck portion 14, and the base 12 to the intermediate neck portion may be accomplished in any one of many ways known in the art, the present invention not being considered to reside in the particular mounting means so employed. It is considered to be sufficient if whatever mounting means are employed, the various component parts are securely mounted together so that the structure remains intact during use.

As to the fan assembly 70, it will be noted that it is a fairly typical fan assembly consisting of a fan motor 76 which operates a fan 77. It will be noted that the upper head portion 16 is provided with a switch 78 which is interposed in the circuit created between the fan motor 76, and the battery pack 80 which is mounted in the base 12. In a manner which is well known in the art with respect to portable fans, the battery pack 80 provides the electrical power for operating the fan motor 76 in response to the manipulation of the switch 78. With respect to the present invention, an additional feature has been incorporated in the present invention in that the battery pack is formed from rechargeable batteries, and the upper head portion 16 is provided with a solar cell 82 which is interconnected with and provides a trickle charge to the rechargeable battery pack 80. Since the intended principal use for the portable fan assembly of the present invention is for sunbathers, it was deemed to be desirable to provide a battery pack which could be easily recharged by the use of solar energy. The battery pack 80 also may be recharged with a conventional charger of the type commonly used (not shown) with AC house current which is plugged into a charging circuit with the battery pack through the adapter plug 84 in the head portion 16.

It will also be appreciated that by providing the intermediate neck portion in a hollow tubular format, the wiring as between the battery pack 80 located in the base 12 and the various switches in the fan motor 76 may be carried within the confines of the intermediate neck portion 14, and if desired, such wiring may be placed in a separate harness (not shown) in order to isolate the same. It is believed that the particular method by which the wiring is carried in the device is dictated by manufacturing methods, and it is not deemed to be critical to the present invention.

Figure 4:
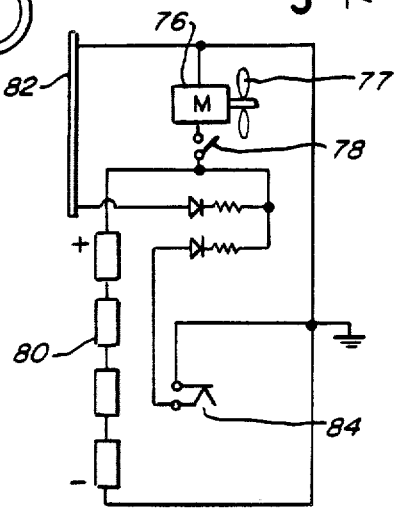
FIG. 4 is a schematic view of the circuitry showing the rechargeable solar batteries, and the solar cell and circuitry therewith for permitting the recharging of the solar batteries.

FIG. 4 illustrates the wiring diagram whereby the battery pack is in electrical communication with the fan motor 76.

FIG. 4 illustrates one manner in which the battery pack 80 can be electrically wired to operate the fan motor 76, and can be provided with a trickle charge from the solar cell 82 and recharged with a plug-in house current charger. Normally, the switch 78 is open in which case the fan motor 76 is not operating and the solar cell 82 provides a trickle charge to the battery pack 80. If it is desired to recharge the battery pack 80 more quickly or overnight, an adapter (not shown) can be plugged into a charging circuit for the battery pack 80 via the adapter 84. When the switch 78 is closed, the fan motor 76 is energized and operates the fan 77. In this situation, the solar cell 82 is still functional to provide a trickle charge to the battery pack 80 to help maintain the charge on the battery pack 80.

It will also be observed from FIG. 1 of the drawings, that the portable fan device 10 may carry additional convenient features such as a clock 90, as well as a temperature gauge 92. Portable quartz clocks are well known in the art, and are now developed to the point where the same are fairly well miniaturized, and very portable. The temperature gauge 92 may be a simple temperature gauge of the type well known in the art, and once again, are now developed to the point where the same are portable and may be very small in size in order to be incorporated in the device of the present invention. These features are considered to be convenient add-on features with respect to the present invention, and not deemed to be a part of the necessary components relative to the overall invention as described and claimed herein.

In accordance with the above description, it will be appreciated that there has been provided an improved portable fan device which is ideally suited for use by sunbathers while sunbathing. The improvement in the present invention resides in the fact that the portable fan assembly as described and claimed herein provides not only a means to obtain a cool air flow, but also in providing a method for dispensing a fluid onto the skin of the sunbather simultaneously with the actuation of the fan. As indicated herein, once the fan is actuated and a cool air flow is developed, the operator need only squeeze the vacuum bulb 39 in order to create an atomizing mist which is picked up by the air flow from the fan, and dispensed onto the body of the user. As indicated, the user may employ pure water as the fluid in the container, or may employ a fluid which contains skin moisturizing agents, or alternatively, the fluid may contain skin blocking agents to facilitate the blocking of the harmful ultraviolet rays of the sun. The advantage of the present invention is that the user may determine the fluid which they desire to dispense, and insert the same within the confines of the inner container 22 in the base 12. For this reason, the present invention has a number of possible uses because the user can determine the fluid to be dispensed.

While there has been described what is at present considered to be the preferred embodiments of the invention, it will be understood that various modifications may be made therein and it is intended to cover in the appended claims all such modifications as fall within the true spirit and scope of the invention.

I claim:

1. A self-contained portable fan device including atomizing means for atomizing a liquid carried therein comprising in combination, a base, an intermediate neck portion mounted on said base at a lower end and extending upwardly therefrom, terminating in an upper end, said intermediate neck portion framed by a flexible tubular member, said upper end of said neck portion carrying a head portion mounted thereon, said head portion including an open front face having a baffle vent mounted therein, fan means mounted within said head portion adjacent and in the direction of said open front face and rearward of said baffle vent, said baffle vent being positioned forwardly of said fan means and above said atomizing means, said atomizing means being mounted within said head portion in operative relation with said fan means, said base adapted to contain a source of fluid therein, said source of fluid being in fluid communication with said atomizing means and including vacuum means associated therewith for moving fluid from said source of fluid to said atomizing means, said fan device provided with self-contained electrical means including switch means associated therewith, said electrical means comprises battery means electrically wired to said fan means through said switch means and being removably mounted within said device, thereby to alternatively activate and deactivate said fan means, whereby said fan means may be activated by said electrical means via said switch means while simultaneously, said vacuum means may be activated to move fluid from said fluid source to said atomizing means and dispense the same therefrom thereby to create a fan blown misting effect.

2. The portable fan device as set forth in claim 1 above, wherein said fan means comprises a fan and a fan motor for driving said fan, said fan and fan motor being mounted on a mount bracket carried within said head portion in spaced relationship with respect to said opened front face and baffle vent, and above said atomizing means.

3. The portable fan device as set forth in claim 1 above, wherein said head portion is L-shaped in configuration, having a leg portion adapted to mount to said upper end of said flexible tubular member, and a foot portion formed integrally with said leg portion and extending outwardly at a 90° angle therefrom, said fan means and atomizing means being mounted in said foot portion and said opened front face being disposed at the terminal end of said foot portion and spaced forwardly of said fan means.

4. The portable fan device as set forth in claim 1 above, wherein said electrical means is removably mounted within said base and comprises a battery pack electrically wired to said fan means through said switch means thereby to activate and deactivate said fan means in response to the actuation of said switch means.

5. The portable fan device as set forth in claim 4 above, wherein said battery pack is formed by solar rechargeable batteries and said fan device is provided with a solar operated charging cell for recharging said batteries, said solar operated charging cell being in operative electrical communication with said solar rechargeable batteries thereby to effect said recharging effect.

6. The portable fan device as set forth in claim 1 above, wherein said atomizing means comprises an atomizing head mounted within said head portion below said fan means, having an atomizing nozzle at its forward end and having a first vacuum line mounted adjacent its back end and extending outwardly to a vacuum bulb, and a second fluid line mounted on said atomizing head rear end in operative position relative to said first vacuum line and being in fluid communication with said source of fluid in said base, whereby compression of said vacuum bulb creates a negative pressure in said second fluid line within said atomizing head and draws fluid through said second fluid line into said atomizing head and exits said atomizing head through said atomizing nozzle as an atomized mist in a fluid path immediately below said open front face of said head portion.

7. The portable fan device as set forth in claim 6 above, wherein said flexible tubular member is hollow throughout its length and is adapted to acommodate said second fluid line extending between said source of fluid in said base and said atomizing head, and further adapted to accommodate said electrical wiring means extending between said battery pack and said base and said fan means carried in said head portion via said switch means thereby to permit the operation of said fan in said head as well as said atomizing means in said head in order to create a wind blown misting effect.

8. The portable fan device as set forth in claim 1 above, wherein said base is further provided with mount means carried thereon and adapted to accommodate the mounting of said device on a variety of said support surfaces.

9. The portable fan device as set forth in claim 8 above, wherein said base is provided with a pair of mount rails formed thereon, each one of said pair of mount rails being mounted in opposed relationship one to the other on said base, and said mount means comprises a clamping member formed by a clamp having an upper end and a lower clamping end, said upper end of said clamp provided with a pair of opposed rail arms, each of said rail arms having an inner end adapted to be slidably engagable within the confines of said mount rails on said base, whereby said clamp may be moved between an upper clamping position and a lower staking position such that said clamp may be employed to mount said device to an upright structure when in the upper clamping position, and staked into the ground surface when moved to its lower staking position.

10. The portable fan device as set forth in claim 9 above, which further includes a spring member mounted on said clamp and interposed between said clamp and said base, said spring member being formed such that said spring normally biasingly urges said clamp against said base.

* * * * *